(12) United States Patent
Dumoulin et al.

(10) Patent No.: US 10,501,131 B2
(45) Date of Patent: Dec. 10, 2019

(54) TRACK FOR A VEHICLE

(71) Applicant: SOUCY INTERNATIONAL INC., Drummondville (CA)

(72) Inventors: Olivier Dumoulin, Drummondville (CA); Magella Bedard, Drummondville (CA); Remi Hamelin, Trois-Rivières (CA); Tommy Marcotte, St-Cyrille de Wendover (CA)

(73) Assignee: SOUCY INTERNATIONAL INC., Drummondville (CA)

(*) Notice: Subject to any disclaimer, the term of this patent is extended or adjusted under 35 U.S.C. 154(b) by 0 days.

(21) Appl. No.: 16/068,349

(22) PCT Filed: Jan. 4, 2017

(86) PCT No.: PCT/CA2017/050006
§ 371 (c)(1),
(2) Date: Jul. 5, 2018

(87) PCT Pub. No.: WO2017/117672
PCT Pub. Date: Jul. 13, 2017

(65) Prior Publication Data
US 2019/0016399 A1 Jan. 17, 2019

Related U.S. Application Data

(60) Provisional application No. 62/274,417, filed on Jan. 4, 2016.

(51) Int. Cl.
*B62D 55/24* (2006.01)
*B62D 55/26* (2006.01)
*B62D 55/14* (2006.01)

(52) U.S. Cl.
CPC .......... *B62D 55/244* (2013.01); *B62D 55/26* (2013.01); *B62D 55/14* (2013.01)

(58) Field of Classification Search
CPC .............................. B62D 55/244; B62D 55/26
See application file for complete search history.

(56) References Cited

U.S. PATENT DOCUMENTS 3,747,995 A * 7/1973 Russ, Sr. .............. B62D 55/244
305/170
4,021,082 A 5/1977 Rasmussen
(Continued)

FOREIGN PATENT DOCUMENTS

CA 1219622 A 3/1987
CA 2490127 C 3/2012
(Continued)

OTHER PUBLICATIONS

International Search Report from PCT/CA2017/050006, Adeeb Zarifa, dated Mar. 17, 2017.
(Continued)

*Primary Examiner* — Kip T Kotter
(74) *Attorney, Agent, or Firm* — BCF LLP

(57) ABSTRACT

A track for a vehicle having a plurality of wheels for driving the track on a terrain. The track has an endless elastomeric carcass having a wheel-facing side that is mountable onto the plurality of wheels, and a ground-facing side opposite the wheel-facing side. A plurality of elastomeric traction surfaces is positioned on the ground-facing side. Each of the traction surfaces has a first shape when the track is not mounted onto the plurality of wheels. A plurality of primary load distribution members is positioned transversely and distributed longitudinally in the carcass so as to distribute at least parts of downward wheel forces applied by at least one of the wheels when the track is being driven down onto the wheel-facing side of the carcass into the traction surfaces via flexion of the primary load distribution members.

23 Claims, 12 Drawing Sheets

(56) References Cited

U.S. PATENT DOCUMENTS

| | | | |
|---|---|---|---|
| 5,800,026 A | 9/1998 | Nagata | |
| 6,932,442 B2 * | 8/2005 | Hori | B62D 55/244 |
| | | | 305/167 |
| 6,984,006 B2 | 1/2006 | Wantanabe et al. | |
| 7,407,236 B2 | 8/2008 | Fukushima | |
| 7,914,090 B2 | 3/2011 | Soucy | |
| 8,016,368 B2 | 9/2011 | Sugihara | |
| 8,191,976 B2 | 6/2012 | Sugihara | |
| 9,162,718 B2 | 10/2015 | Lussier et al. | |
| 2003/0019133 A1 | 1/2003 | Hori | |
| 2008/0100134 A1 * | 5/2008 | Soucy | B62D 55/244 |
| | | | 305/179 |
| 2011/0169324 A1 | 7/2011 | Ijiri | |
| 2014/0239709 A1 * | 8/2014 | Delisle | B62D 55/24 |
| | | | 305/159 |
| 2016/0016621 A1 | 1/2016 | Favre et al. | |

FOREIGN PATENT DOCUMENTS

| | | |
|---|---|---|
| DE | 3013018 A1 | 10/1981 |
| FR | 2669288 A1 | 5/1992 |
| GB | 701944 A | 1/1954 |
| JP | 59118580 A | 7/1984 |
| JP | H01150182 U | 10/1989 |
| JP | 8150970 A | 11/1994 |
| JP | 3318724 B2 | 8/2002 |
| JP | 2003040155 A | 2/2003 |
| JP | 2005263090 A | 9/2005 |
| JP | 2007145096 A | 6/2007 |
| JP | 2007230266 A | 9/2007 |
| JP | 2009227046 A | 10/2009 |
| JP | 2010036730 A | 2/2010 |
| JP | 5279438 A | 5/2013 |
| RU | 2510349 C1 | 3/2014 |
| SU | 1525073 A1 | 11/1989 |
| WO | 2014138938 A1 | 9/2014 |

OTHER PUBLICATIONS

Supplementary European Search Report issued in EP 17722366 dated Jul. 10, 2019, AREAL Calama.

English abstract of RU 2510349 retrieved from Espacenet on Jul. 15, 2019.

* cited by examiner

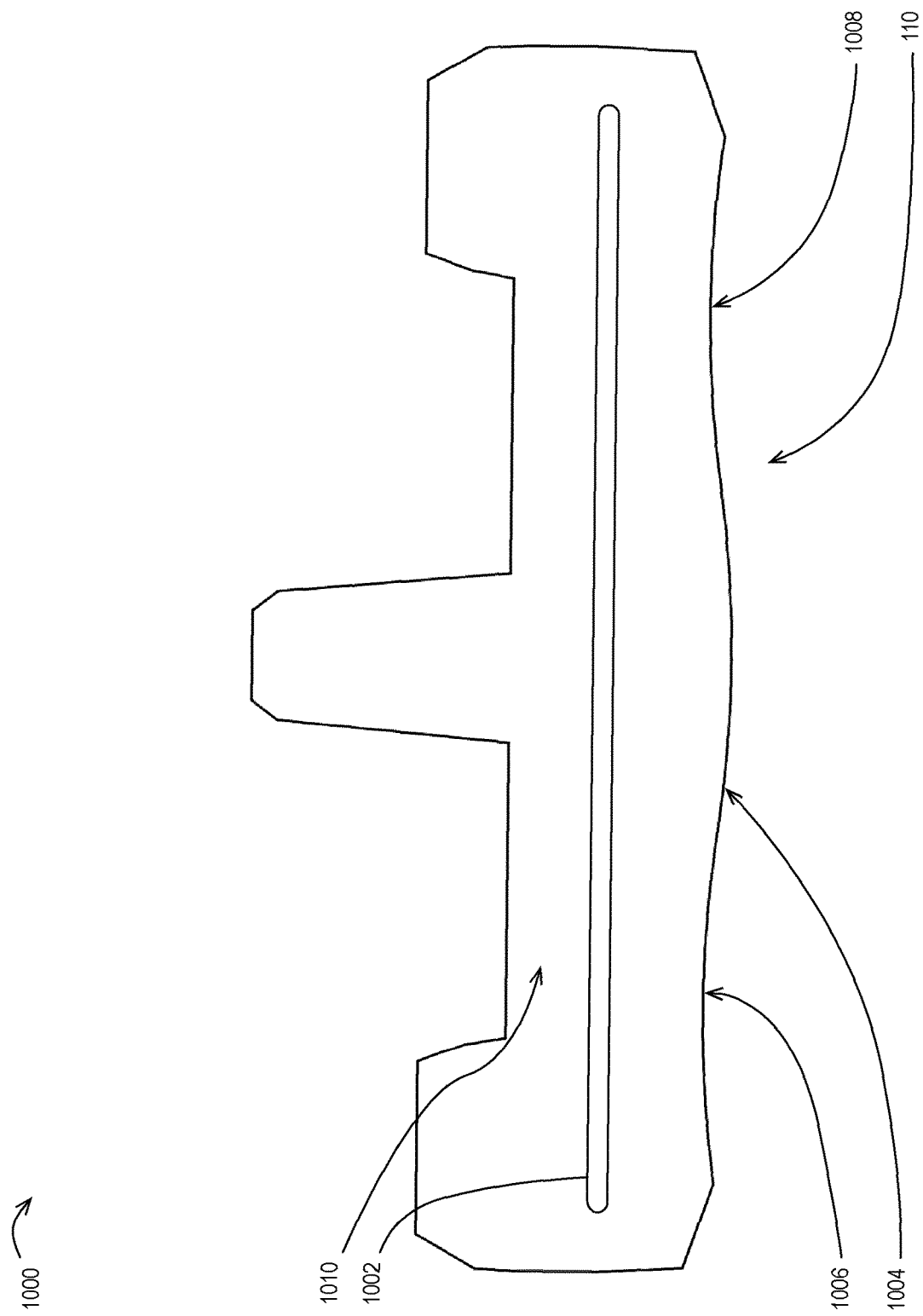

TRACK FOR A VEHICLE

PRIORITY

The present application claims priority to U.S. Provisional Patent Application No. 62/274,417 filed Jan. 4, 2016, entitled "MULTIDIRECTIONAL TREAD SHAPE FOR UNIFORM PRESSURE DISTRIBUTION AND METHOD THEREOF", the entirety of which is incorporated herein.

TECHNICAL FIELD

The embodiments disclosed herein relate generally to tracks for vehicles, and more particularly to tracks for heavy vehicles, including military vehicles.

BACKGROUND

Numerous tracks for vehicles, for conveying driving forces from the vehicles onto a terrain, are known.

For example, WO2014138938A1 describes a track for traction of an off-road vehicle such as an agricultural vehicle, a construction vehicle, a snowmobile, or another vehicle operable off-road. The track is mountable around a track-engaging assembly comprising a drive wheel and mid-rollers. The track is elastomeric to be flexible around the track-engaging assembly. The track comprises an inner surface for facing the track-engaging assembly, a ground-engaging outer surface for engaging the ground, and a plurality of traction projections projecting from the ground-engaging outer surface. The track has a widthwise-curved carcass that results in the ground-engaging outer surface being concave. The track has transversal cables in the carcass that are arranged such that they tension under loading of the mid-rollers and distribute load via that tension in a widthwise direction of the track.

As another example, JP2009227046A describes another track for a vehicle. The track has a concave ground contacting surface and excludes metal cores from the track. This publication states that the track eliminates uneven wear of the lugs of the track and prevents mud from attaching to the body of the track by, at least in part, excluding metal cores from the track to make the track sufficiently flexible. This publication further states that a problem with rubber tracks that existed prior to the tracks disclosed in this publication is that those prior rubber tracks had metal cores and were, as a result, too rigid in that under load of the vehicle the ground-contacting surface of the track directly below the metal core remained substantially a curved shape, and thus experienced uneven ground pressure distribution, resulting in uneven wear of the lug.

As further example, as shown in (prior art) FIG. 12, which is an excerpt from US2003/0019133A1, US2003/0019133A1 describes an elastic-bodied crawler which is driven by drive power from driven projections provided on an inner peripheral surface of the crawler, and comprises load propagating means embedded centrally of the crawler in a widthwise direction to extend over treads of rollers. The load propagating means allegedly causes pressing forces (ground pressure) of the rollers to act generally in a widthwise direction whereby a ground pressure distribution on a ground surface of the crawler is equalized, and local wear in lug portions is eliminated to enhance durability of the crawler.

SUMMARY

Prior art tracks, such as the example prior art tracks described above, have a number of drawbacks. In one aspect, where tracks are implemented with heavy vehicles, and particularly where tracks are implemented with heavy military vehicles (such as armoured military vehicles), changes to features and aspects of the tracks, including changes that may at least at a first glance appear to persons who are not skilled in the art to be trivial, may in fact have technical implications for such vehicles.

In another aspect, in such applications, changes, including changes that may appear to persons skilled in the art to be trivial, may have unexpected technical applications for such vehicles. Thus, tracks that may be designed for, for example, relatively lighter vehicles, the tracks may have drawbacks when implemented with relatively heavier vehicles, and in some cases, may not be feasibly implemented with some relatively heavier vehicles. A few examples of drawbacks are described next.

For example, the transverse cables that are positioned in the traction lugs of the tracks described in WO2014138938A1 may, in one aspect, experience unequal tension when the tracks are being driven. Unequal tension may result in, for example, relatively uneven engagement with and relatively uneven wear of driving sprockets that may be used to drive the tracks. In another aspect, relatively complex equipment or methods or processes may be required to produce such tracks. Accordingly, such tracks may be relatively expensive to manufacture. In a further aspect, uneven tension may, in some applications result in such tracks having a relatively limited lifespan, or a relatively limited range of driving conditions with which such tracks may be used.

As another example, the tracks described in JP2009227046A may be suitable for relatively light and relatively slow-moving vehicles, and may, in one aspect, not be suitable for relatively heavy vehicles. In another aspect, the tracks described in JP2009227046A lack "metal cores" and may therefore experience relatively high pressure variations in the traction surfaces of the tracks when being driven. The pressure variations may cause premature failure or wear-out of the tracks.

To provide yet another example, the tracks with the "load propagating means" described in US2003/0019133A1 may, in one aspect, have relatively high pressure variations in the tracks when being driven, which variations may, at least in some applications, lead to premature wear-out or failure of the tracks. A track may be worn-out where the track has undergone at least one change as a result of being used such that it is no longer usable, or at least no longer safely usable, for its intended application(s).

In view of the drawbacks of prior art tracks, a few examples of which drawbacks have been described above, it may be desirable to provide improved tracks. In a more particular aspect, it may be desirable to provide improved tracks for heavy vehicle applications, the applications including military vehicle applications.

For example, it may be desirable to provide a track for a vehicle, which track when being driven may generate relatively less heat in at least some applications. It may also be desirable to provide a track for a vehicle, which track when being driven may have a more uniform pressure distribution in at least some of the track's traction surfaces when the traction surfaces contact at least certain types of terrain over which the vehicle having the track may drive. In yet another aspect, it may be desirable to provide a track for a vehicle, which track may take longer to wear out in at least some applications.

In yet a further aspect, it may be desirable to provide a track for a vehicle, which track may be relatively cheaper to manufacture for at least some applications. In yet another aspect, it may be desirable to provide a track for a vehicle, which track may be suitable for use with relatively heavier vehicles, including, for example, vehicles having a gross vehicle weight that falls into a range of 7 to 90 metric tonnes.

This document provides a number of tracks for vehicles. In an aspect, this document provides a track for a vehicle having a plurality of wheels for driving the track on a terrain. The first track may comprise: an endless elastomeric carcass having a wheel-facing side that is mountable onto the plurality of wheels, and a ground-facing side opposite the wheel-facing side; a plurality of elastomeric traction surfaces positioned on the ground-facing side, each of the traction surfaces having a concave first shape when the wheel-facing side of the carcass is not mounted onto the plurality of wheels; and a plurality of primary load distribution members positioned transversely and distributed longitudinally in the carcass so as to distribute, when the track is being driven, at least parts of downward wheel forces applied by at least one of the wheels down onto the wheel-facing side of the carcass into the traction surfaces via flexion of the primary load distribution members.

In another aspect, this document provides a track for a vehicle having a plurality of wheels for driving the track on a terrain. The second track comprises: an endless elastomeric carcass having a wheel-facing side that is mountable onto the plurality of wheels, and a ground-facing side opposite the wheel-facing side; a plurality of elastomeric traction surfaces positioned on the ground-facing side, each of the traction surfaces having a first shape that may be one of concave and substantially planar when the wheel-facing side of the carcass is not mounted onto the plurality of wheels; and a plurality of concave primary load distribution members positioned transversely and distributed longitudinally in the carcass so as to distribute when the track is being driven at least parts of downward wheel forces applied by at least one of the wheels down onto the wheel-facing side of the carcass into the traction surfaces via flexion of the primary load distribution members.

In a further aspect, each of the primary load distribution members may have a first spring constant in flexion. The first spring constant may be selected such that each of the primary load distribution members is flexible between a first loaded position and a first unloaded position, and biased toward the first unloaded position, and such that that primary load distribution member is: a) in the first unloaded position when no wheel force of the downward wheel forces is applied to the wheel-facing side of the carcass over that primary load distribution member, and b) in the first loaded position when a first downward wheel force of the downward wheel forces is applied to the wheel-facing side of the carcass over that primary load distribution member.

In some embodiments, the track may further comprise a plurality of auxiliary load distribution members, each of the auxiliary load distribution members being positioned transversely and distributed longitudinally in the carcass to cooperate with the primary load distribution members to distribute into the primary load distribution members at least parts of the downward wheel forces via flexion of the auxiliary load distribution members.

In some embodiments, track may be designed for vehicles that are relatively heavy. In an aspect, these vehicles may include military vehicles. In a further aspect, these vehicles may include armored military vehicles. In some cases, the vehicles for which various embodiments of the first and second tracks may be designed may have a gross vehicle weight that may be in a range of, for example, 10 to 90 metric tonnes, and may have a number of road wheels on each side of the vehicle that is, for example, in a range of 2 to 14 road wheels.

BRIEF DESCRIPTION OF THE DRAWINGS

The drawings included herewith are for illustrating various embodiments of articles, products, methods, and apparatuses described in the present specification. In the drawings:

FIG. 10 is a generic front section view of one of the tracks of FIG. 1, according to a given embodiment of that track, taken along section lines A-A of FIG. 1;

DETAILED DESCRIPTION

Figure 1:
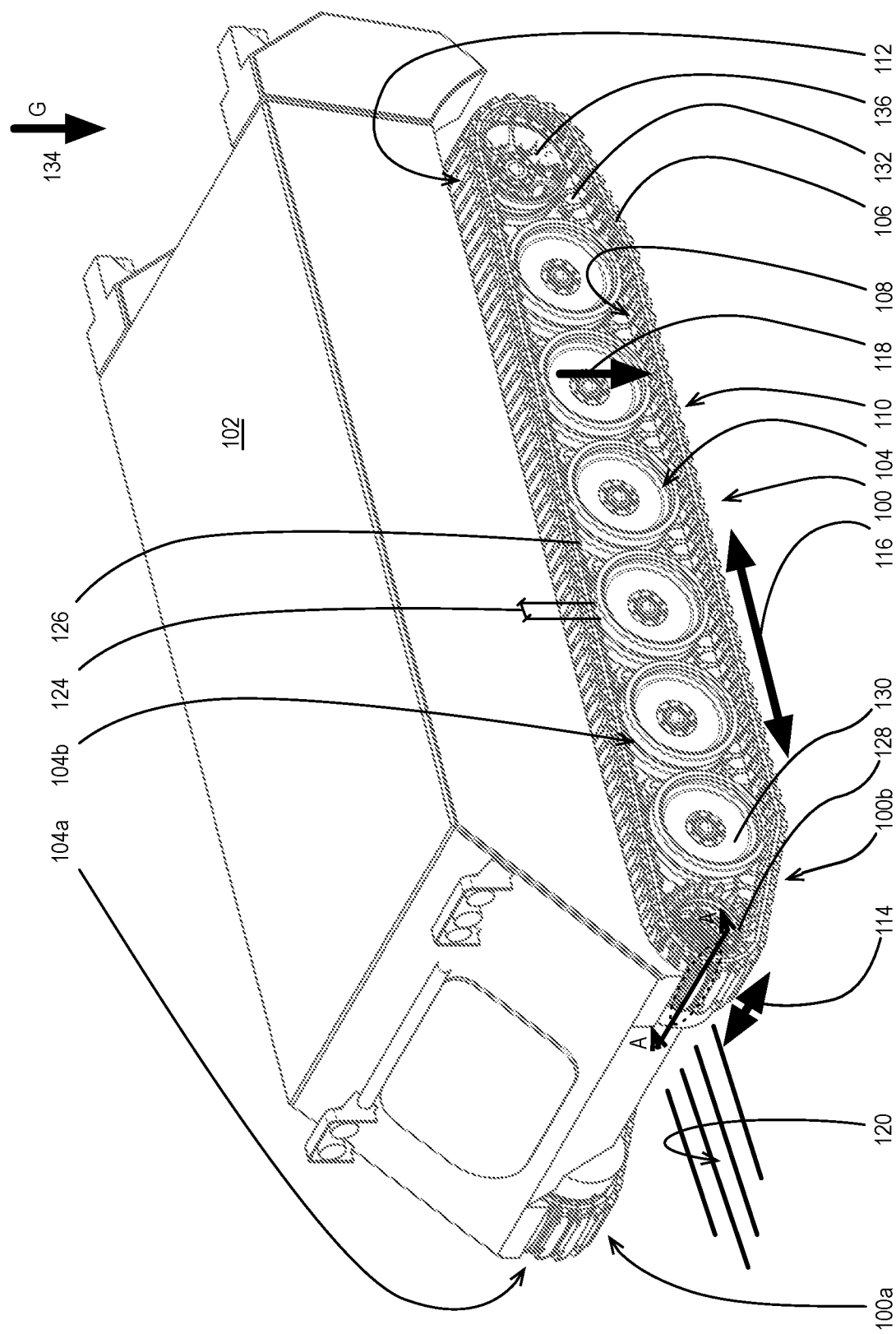
FIG. 1 is an isometric view of a vehicle with a track mounted onto a first plurality of wheels and a track mounted onto a second plurality of wheels.

The examples and conditional language recited herein are intended to aid the reader in understanding the principles of the present technology and not to limit its scope to such specifically recited examples and conditions. The headings in this section of the document are used solely to improve readability of the detailed description, and were not meant to be used for, and must not be used for, interpreting any of the information included in the detailed description. The headings do not separate the detailed description into sections, and the detailed description should be read and interpreted as though the headings in the detailed description do not exist.

To maintain clarity, and in view of the number of embodiments described in this document, the document may at times describe features by using one, or some, but not necessarily all of the reference numerals that may be applicable to those features in the various embodiments. Omissions of reference numerals were not intended to indicate in and of themselves, and should not be construed to indicate in and of themselves, that where a reference numeral that identifies a feature in one embodiment is not included in a given place in the description, that that embodiment of that feature is not applicable to the matter or embodiment(s) being described at that given place in the description. In other words, in some instances in the description, otherwise applicable reference numerals are omitted to maintain clarity of the description.

In another aspect, the figures that are included with this document are not to scale, and some features shown in the figures (for example, features such as the concavities of traction surfaces) may be exaggerated relative to their possible "life" sizes and dimensions, in order to make these features clearly visible in the figures. Also for clarity, this document uses the terms "down" and "downward" to indicate a direction, for example of forces, that is parallel to and is in the direction of the force of gravity. The direction of the force of gravity is approximately shown by reference arrow 134 in FIG. 1.

General

Reference is made to FIG. 1, which shows an example track 100 for a vehicle 102 having a plurality of wheels 104 for driving the track 100 on a terrain 120. More particularly, FIG. 1 shows a vehicle 102 with a first track 100a mounted onto a first plurality of wheels 104a and a second track 100b mounted onto a second plurality of wheels 104b. However, to maintain clarity, this document will simply use the terms "the plurality of wheels 104", and "the wheels 104" to refer to a given plurality of wheels 104a, 104b on one side of a given vehicle 102 onto which wheels 104 a given track 100a, 100b may be mountable.

As shown in FIG. 1, the plurality of wheels 104 may include a plurality of road wheels 130 that may support the vehicle 102 on the terrain 120, an idler wheel 136 that may maintain a desired tension in the track 100 when the track 100 is being driven, and a drive wheel 128 that may apply driving forces to the track 100 for driving the vehicle 102. As shown, the drive wheel 128 may be, for example, a drive sprocket 128.

A Given Embodiment of the Track

As shown in FIG. 1, the track 100 includes an endless elastomeric carcass 106. The endless elastomeric carcass 106 has a wheel-facing side 108 that is mountable onto the plurality of wheels 104, and a ground-facing side 110 opposite the wheel-facing side 108. The track 100 also includes a plurality of elastomeric traction surfaces 112 positioned on the ground-facing side 110 of the carcass 106. Each of the traction surfaces 112 may support the vehicle 102 on the terrain 120 and may transfer driving forces that the track 100 may receive from the vehicle 102 into the terrain 120 for driving the vehicle 102 when that traction surface 112 contacts the terrain 120.

Additional Features not Explicitly Shown

In a further aspect, in addition to the features described in this document, the wheel-facing side 108 of the carcass 106 may include additional features known in the art, that may be positioned, for example, between the wheel-facing side 108 of the carcass 106 and the wheels 104, which features may be required for, for example, mounting the wheel-facing side 108 of the carcass 106 onto particular wheels 104 that a given embodiment of the track 100 may be designed for, and for using the track 100 with those particular wheels 104.

Thus, application of a force, such as a downward wheel force an example of which is shown by arrow 118 in FIG. 1, onto the wheel-facing side 108 of the carcass 106 may include an application of at least a part of the downward wheel force onto the additional features, if any (i.e. depending on each particular embodiment of the track 100), that may be positioned (and not necessarily shown or described in this document) between the wheel-facing side 108 of the carcass 106 and the wheels 104.

Drive Lugs and Guide Lugs

In some embodiments, the track 100 may comprise guide lugs 132 for maintaining a widthwise alignment of the track 100 relative to the wheels 104. In an aspect, the guide lugs 132 may be distributed longitudinally on the wheel-facing side 108 of the carcass 106 and may be positioned to engage with at least some of the wheels 104 to maintain the track 100 in widthwise alignment with the at least some of the wheels 104 when the track 100 is being driven.

In some embodiments, the track 100 may comprise drive lugs 126 for receiving driving forces from the vehicle 102, for example via a drive wheel 128, for driving the track 100. In an aspect, the drive lugs 126 may be distributed longitudinally on the wheel-facing side 108 of the carcass 106 and may be positioned to engage with at least one of the wheels 104 to receive driving forces from the at least one of the wheels 104 for driving the track 100. The at least one of the wheels 104 may be, for example, a drive sprocket 128.

In some embodiments, the track 100 may comprise both the drive lugs 126 and the guide lugs 132. In some embodiments, and as better shown in FIG. 2, the drive lugs 126 may be spaced from the guide lugs 132. In other embodiments, for example in the embodiment shown in FIG. 11B, each one of the drive lugs 1112 may be also one of the guide lugs 1112. In another aspect, in such embodiments each of the drive lugs 1112 may be made integral with one of the guide lugs 1112. In yet another aspect, in such embodiments each of the drive lugs 1112 may also function as a guide lug 1112.

The Concave First Shape

Figure 4:
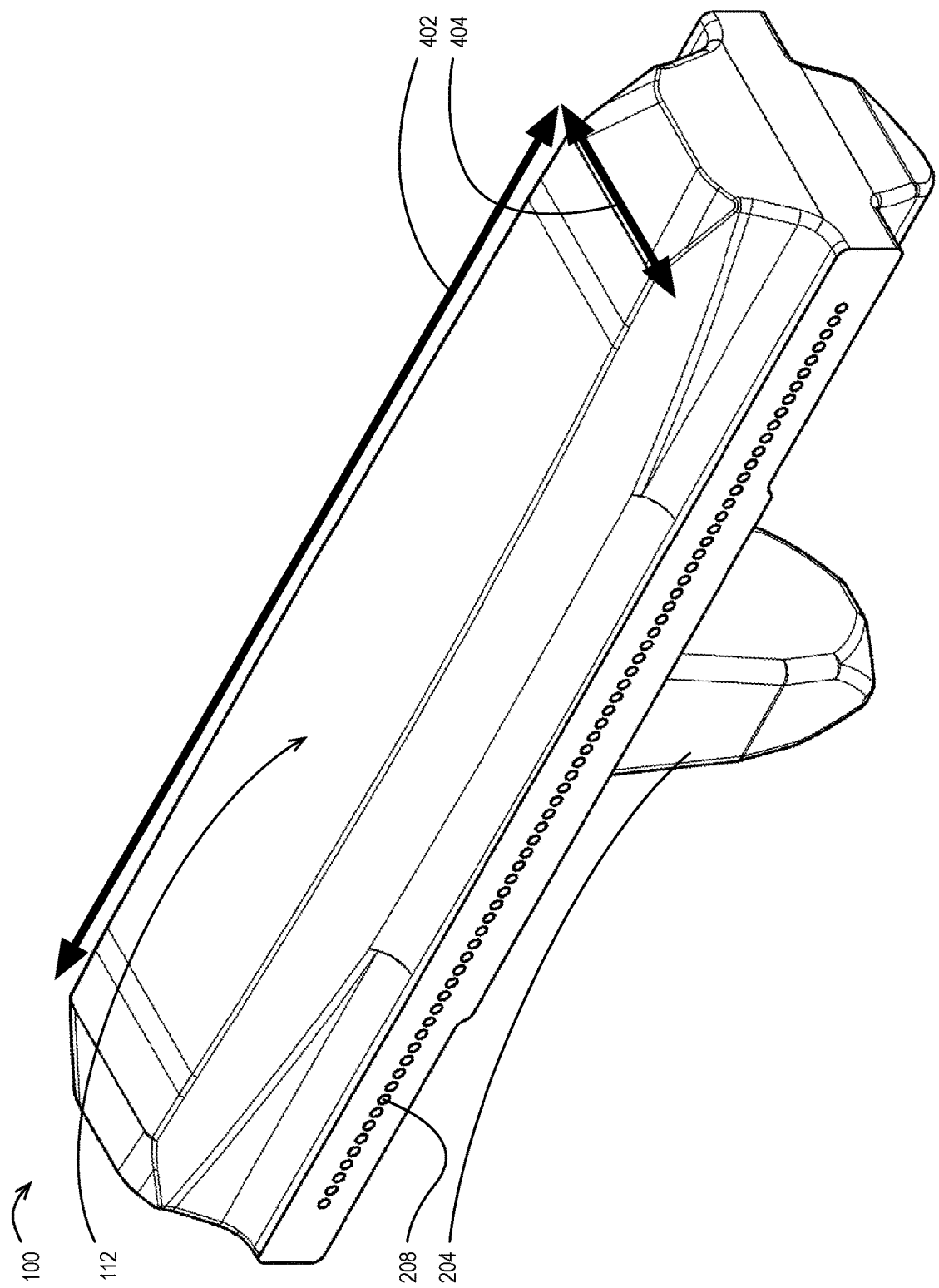
FIG. 4 is a second isometric view of the part of that track of FIG. 2.

Reference is now made to FIG. 4. As shown, in some embodiments of the track 100, each of the traction surfaces 112 may have a concave first shape 112 when the wheel-facing side 108 of the carcass 106 is not mounted onto the plurality of wheels 104. To clarify, when the wheel-facing side 108 of the carcass 106 is not mounted onto the plurality of wheels 104, the track 100 is not mounted onto the wheels 104.

Primary Load Distribution Members

Figure 3:
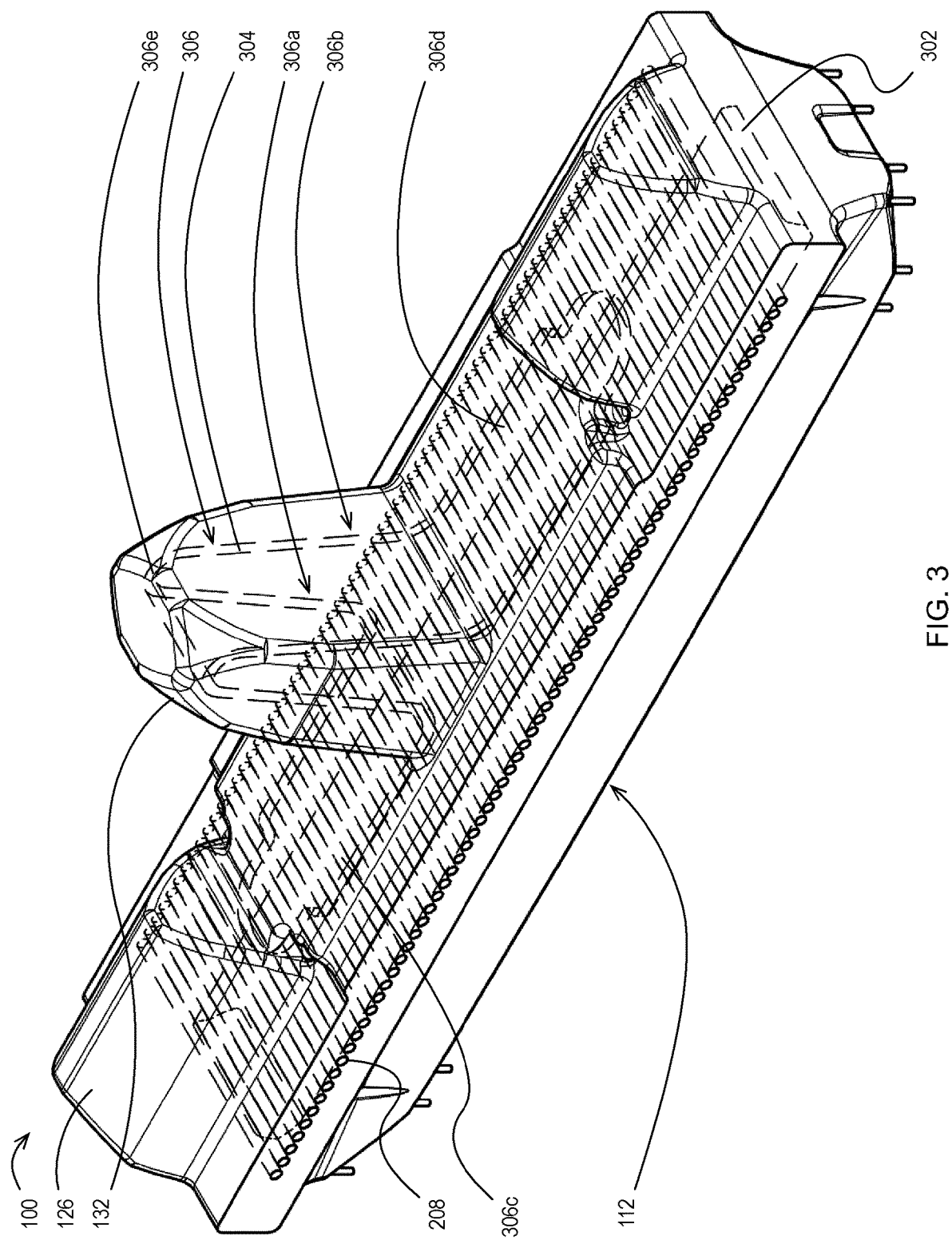
FIG. 3 is a first transparent isometric view of the part of that track of FIG. 2.
Figure 5:
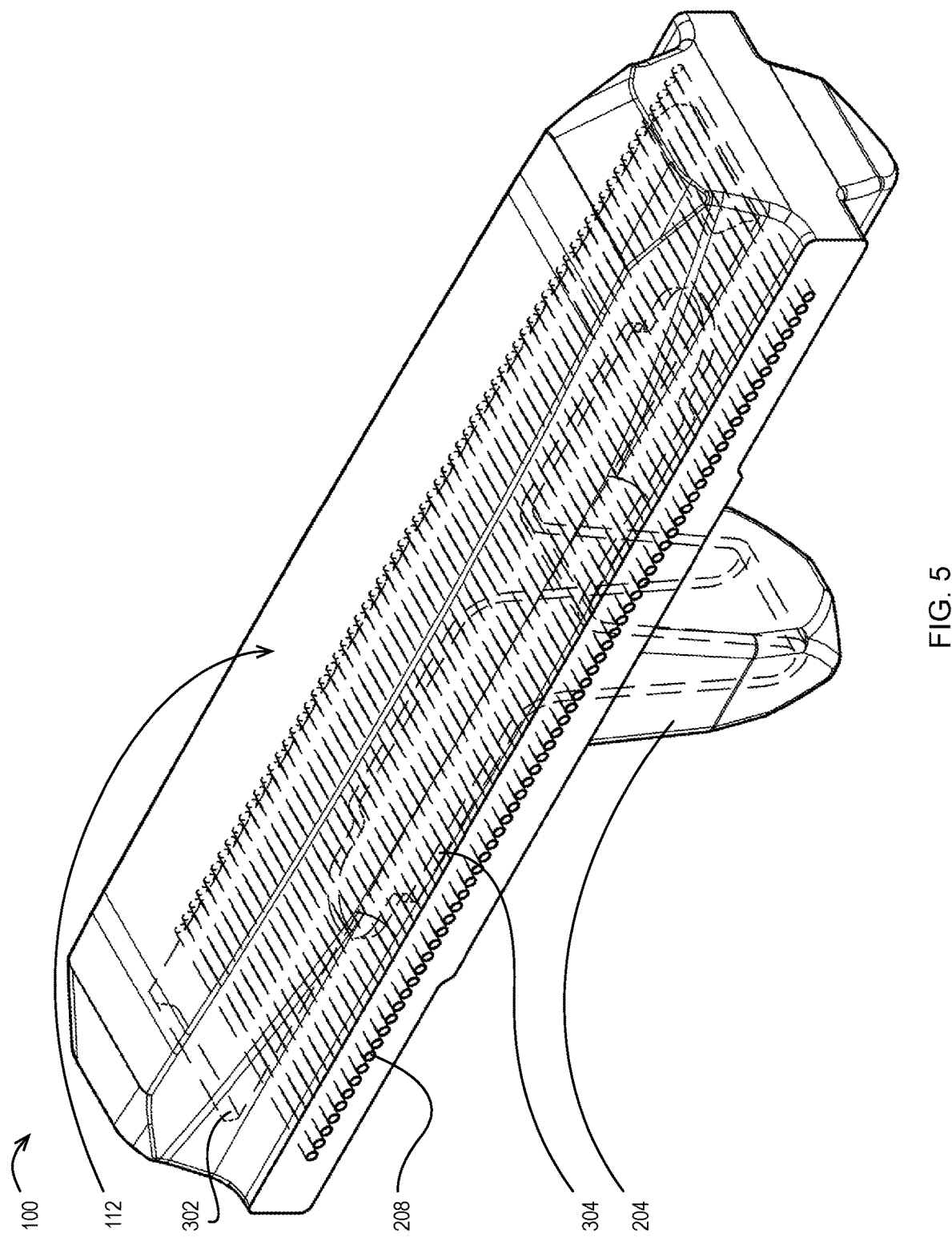
FIG. 5 is a second transparent isometric view of the part of that track of FIG. 2.

Reference is now made to FIGS. 1, 3 and 5. In another aspect, the track 100 may also include a plurality of primary load distribution members 302. The primary load distribution members 302 may be positioned transversely, as for example shown by reference arrows 114 in FIG. 1, and distributed longitudinally, as for example shown by reference arrows 116 in FIG. 1, in the track 100 so as to distribute, when the track 100 is being driven, at least parts of downward wheel forces applied by at least one of the wheels 104 down onto the wheel-facing side 108 of the carcass 106 into the traction surfaces 112 via flexion of the primary load distribution members 302. An example downward wheel force is shown by reference arrow 118 in FIG. 1.

When the track 100 is being driven, it may be driven around the wheels 104 on to which it may at that time be mounted. In other words, the track 100 may rotate around those wheels 104. As the track 100 rotates, each of the traction surfaces 112 of that track 100 may come in and out of contact with the terrain 120. In an aspect, at the times when each of the traction surfaces 112 may receive the at least parts of the downward wheel forces, that traction surface 112 may be in contact with the terrain 120.

Thus, at those times, the at least parts of the downward wheel forces 118 that may be received by that traction surface 112 may be distributed into the terrain 120 via that traction surface 112. The vehicle 102 may thus be at least partially supported by the traction surfaces 112 that are at any given time in contact with the terrain 120 (for example, on one side 100b of the vehicle 102) and driven on the terrain 120 via those traction surfaces 112.

An Aspect of Pressure Equalization

Figure 7:
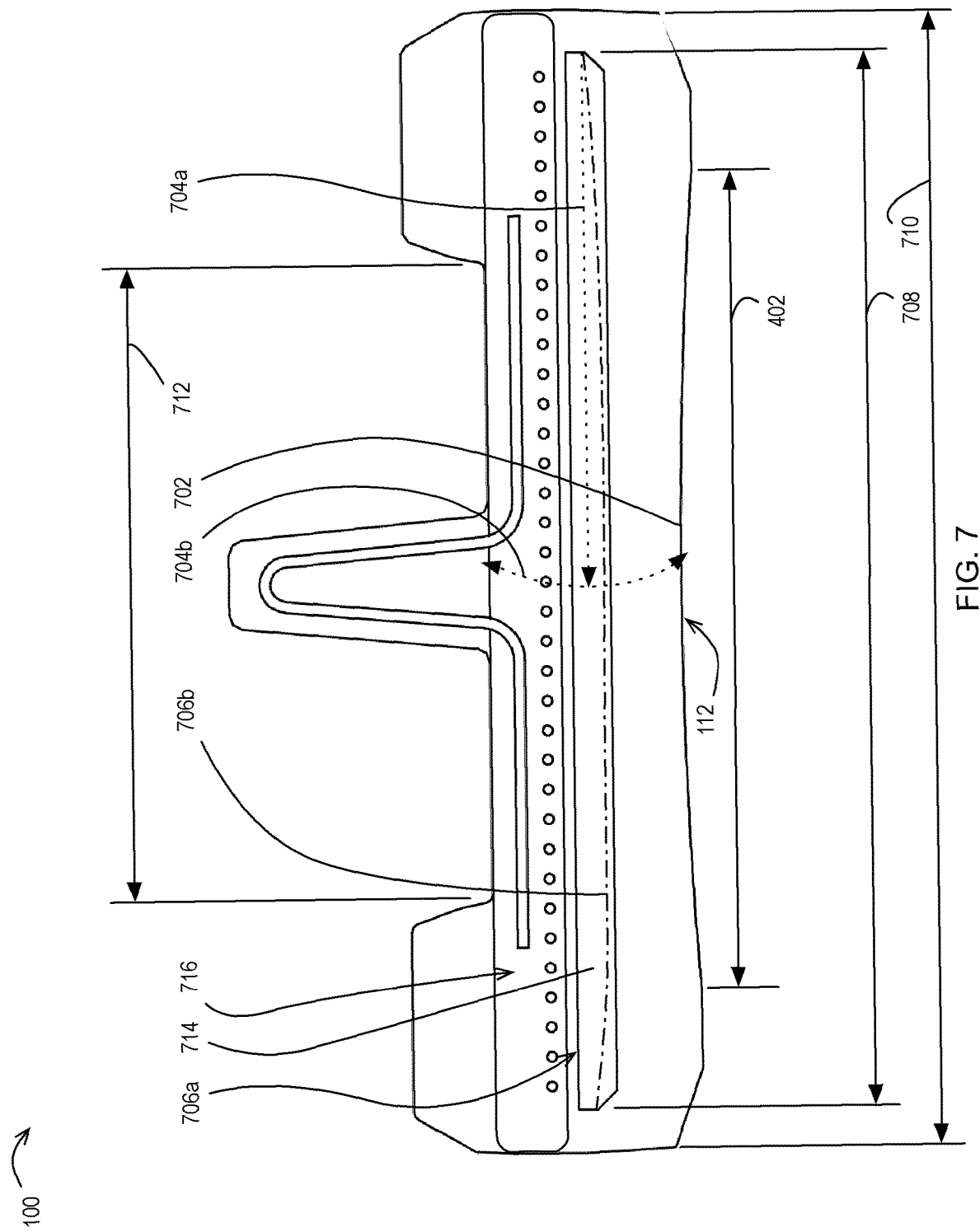
FIG. 7 is a front section view of one of the tracks of FIG. 1, according to a second embodiment of that track, taken along section lines A-A of FIG. 1.

Reference is now made to FIG. 7. In an aspect, each of the primary load distribution members 302 of a given embodiment of the track 100 may have a first spring constant in flexion. An example of a flexion radius 704a and possible flexion directions 704b of an example primary load distribution member 714 are shown in FIG. 7 by reference arrows 704b.

First Spring Constant

In an aspect, the first spring constant of each of the primary load distribution members 302, 714 may be selected such that that primary load distribution member 302, 714 may be flexible between a first loaded position 706b and a first unloaded position 706a and biased toward the first unloaded position 706a, and such that that primary load distribution member 302, 714 is: a) in the first unloaded position 706a (for example as shown by reference numeral 706a in FIG. 7) when no downward wheel force 118 of the downward wheel forces 118 is applied to the wheel-facing side 108 of the carcass 106 over that primary load distribution member 302, 714, and b) in the first loaded position 706b (for example as shown by reference numeral 706b in FIG. 7) when a first downward wheel force 118 of the downward wheel forces 118 is applied to the wheel-facing side 108 of the carcass 106 over that primary load distribution member 302, 714.

In some embodiments, when: a) each of the primary load distribution members 302, 714 is in the first loaded position 706b, and b) a traction surface 112 that is disposed under that primary load distribution member 302, 714 at that time contacts a substantially planar portion of the terrain 120 (for example as shown by reference numeral 914 in FIG. 9), substantially all of that traction surface 112 may contact that portion 914 of the terrain 120. In another aspect, at that time that traction surface 112 may have a substantially planar shape. In a further aspect, that portion 914 of the terrain 120 at that time may apply reaction forces (in a direction opposite to the downward wheel forces 118) to substantially all of the substantially planar shape of that traction surface 112.

Definition of "Corresponds"

In one aspect, a traction surface 112 that is disposed under a primary load distribution member 302, 714 at the time when that a primary load distribution member 302, 714 is in the first loaded position 706b, corresponds to that primary load distribution member 302, 714, and that primary load distribution member 302, 714 corresponds to that traction surface 112.

In another aspect, an auxiliary load distribution member 304 that at that time may be disposed over that primary load distribution member 302 corresponds to that that primary load distribution member 302 and to that traction surface 112, and that traction surface 112 corresponds to that auxiliary load distribution member 304.

In a further aspect, a traction surface 112 that receives at least one force from a particular primary load distribution member 302 when that traction surface 112 contacts the terrain 120 and when at that time at least one of the plurality of wheels 104 of the vehicle 102 applies a force to the wheel-facing surface 108 of the carcass 106 over that particular primary load distribution member 302, corresponds to that particular primary load distribution member 302, and that particular primary load distribution member 302 corresponds to that traction surface 112.

Example Primary Load Distribution Member Embodiments

As shown in FIG. 7, in some embodiments of the track 100 in which each of the traction surfaces 112 has the concave first shape when the wheel-facing side 108 of the carcass 106 is not mounted onto the wheels 104 (i.e. when the track 100 is not mounted onto any wheels), each of the primary load distribution members 302 may have a shape that is substantially flat when that primary load distribution member 302 is in the first unloaded position 706a.

Figure 8:
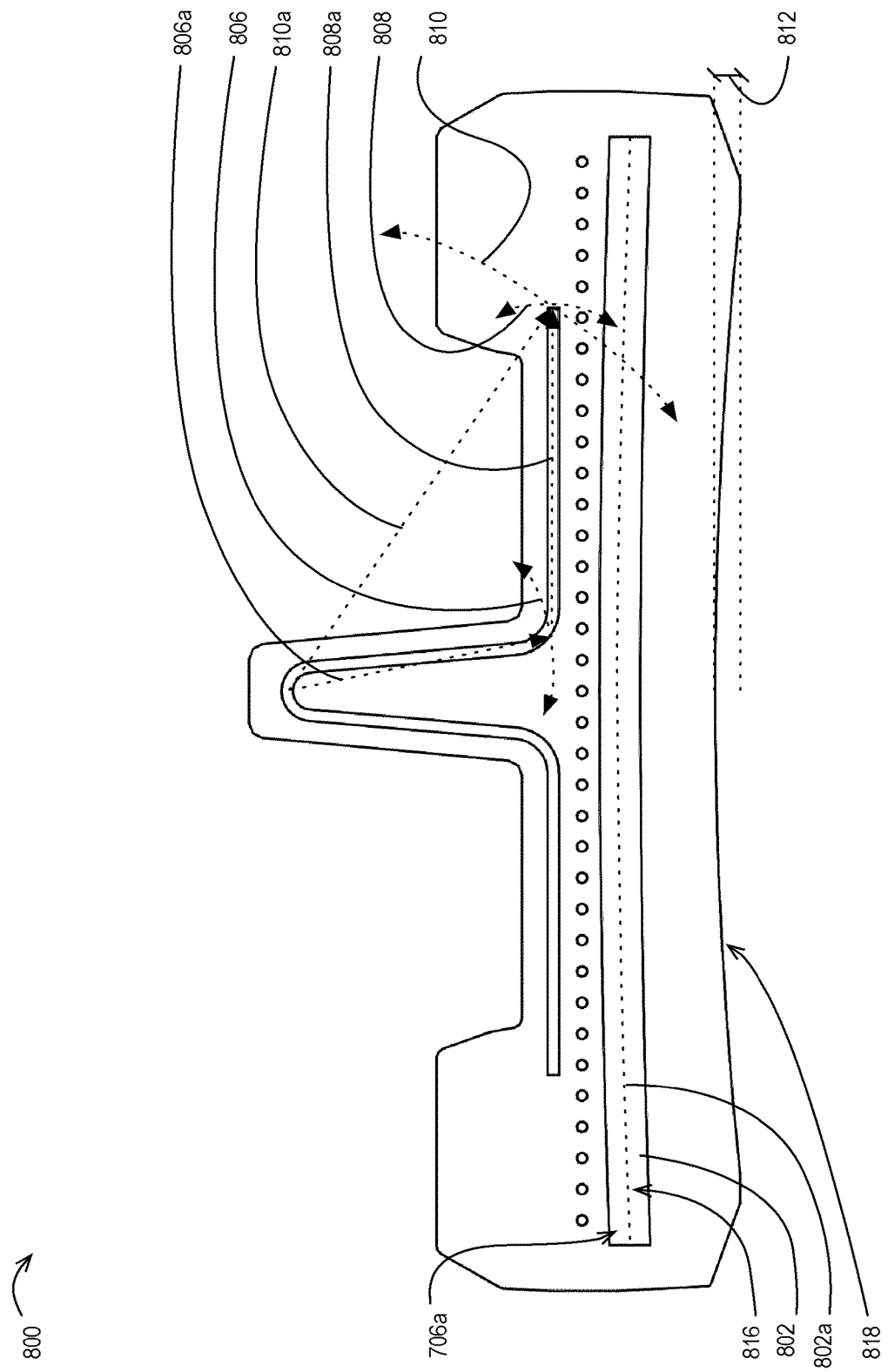
FIG. 8 is a front section view of one of the tracks of FIG. 1, according to a third embodiment of that track, taken along section lines A-A of FIG. 1.

As shown in FIG. 8, in other embodiments of the track 800 in which each of the traction surfaces 112 has the concave first shape when the wheel-facing side 108 of the carcass 106 is not mounted onto the wheels 104, each of the primary load distribution members 802 may be concave (as shown by reference line 802a) when that primary load distribution member 802 is in the first unloaded position 706a.

Figure 9:
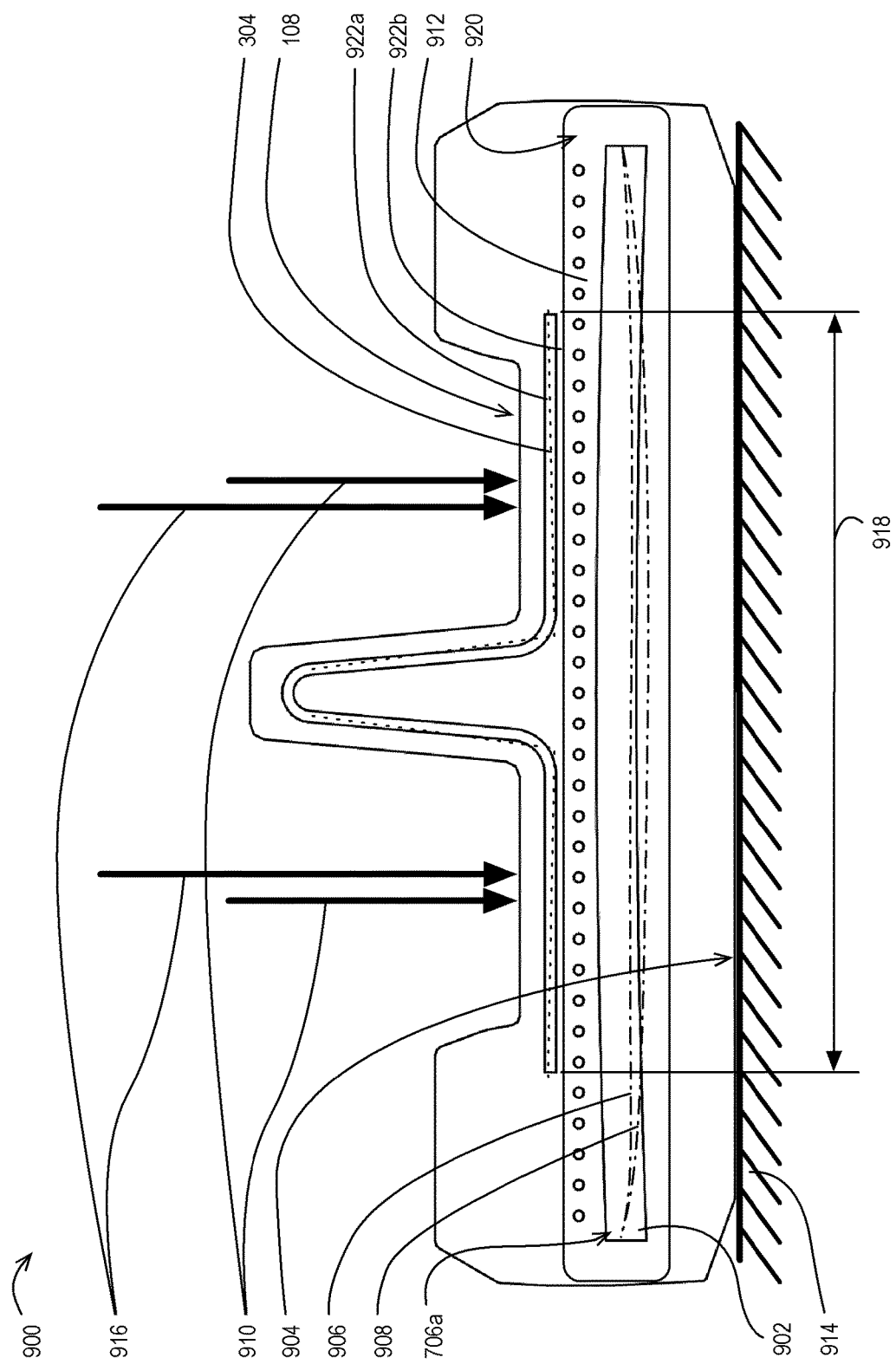
FIG. 9 is a front section view of one of the tracks of FIG. 1, according to a fourth embodiment of that track, taken along section lines A-A of FIG. 1.

As shown in FIG. 9, in some embodiments of the track 900 in which each of the traction surfaces 904 has a substantially planar shape when the wheel-facing side 108 of the carcass 106 is not mounted onto the wheels 104, each of the primary load distribution members 902 may be concave when that primary load distribution member 902 is in the first unloaded position 706a.

In an aspect, in embodiments of the track 100 in which each of the primary load distribution members 902 is concave when that primary load distribution member 902 is in the first unloaded position 706a, the concavity of each of the primary load distribution members 902 may be selected to cooperate with the other features of those embodiments of the track 100 to, for example, reduce pressure variations that may be experienced by the traction surfaces 112 of those embodiments of the track 100 when those embodiments of the track 100 are driven.

Possible Traction Surface Positioning

Reference is now made to FIG. 8. In an aspect, in embodiments of the track 800 in which each of the traction surfaces 818 has the first shape when the wheel-facing side 108 of the carcass 106 is not mounted onto the wheels 104, each of the traction surfaces 818 of the track 800 may be positioned on the ground-facing side 110 of the carcass 106 such that at least one of the primary load distribution members 802 is disposed between that traction surface 818 and the wheel-facing side 108 of the carcass 106.

In a further aspect, in such embodiments the first shape of that traction surface 818 may be selected to cooperate with that primary load distribution member 802 such that that traction surface 818 may have a substantially planar shape when: a) a first downward wheel force of the downward wheel forces is applied down onto the wheel-facing side 108 of the carcass 106 over that primary load distribution member 802, and b) that traction surface 818 contacts a substantially planar portion of the terrain 120.

As it is described elsewhere in this document, in some embodiments the first shape may be concave. In other embodiments, the first shape may be substantially planar.

Aspects of Track Selection

The first downward wheel force may be selected to suit particular application(s) of a given embodiment of the track 100. That is, a suitable combination of materials and geometries of the various features of a given embodiment of the track 100 may be selected such that that track 100 may function as described under the first downward wheel force.

For example, the first downward wheel force may be selected such that the primary load distribution members 802 that at a given time when the track 100 is being driven may be disposed under the road wheels 130 of a given vehicle 102 driving the track 100 are at that given time in the first loaded position 706*b* when the vehicle 102 is loaded to its maximum rated capacity. In another example, the first downward wheel force may be selected such that these primary load distribution members 302 at that given time may be in the first loaded position 706*b* when the vehicle 102 is fuelled and is carrying passengers and no other load.

Another Aspect of Pressure Equalization

In some embodiments, the traction surfaces 112 may be positioned on the ground-facing side 110 of the track 100 so as to receive downward wheel forces 118 from corresponding ones of the primary load distribution members 302 when contacting the terrain 120. Thus, for example as shown in FIG. 1, each of the traction surfaces 112 may be positioned on the ground-facing side 110 of the track 100 such that that traction surface 112 may be disposed under at least one of the primary load distribution members 302 when that traction surface 112 contacts the terrain 120 when the track 100 is being driven to receive at least parts of the downward wheel forces that may be received at that time by that primary load distribution member 302.

As a result of the force distribution function of the primary load distribution members 302, the pressure that may be experienced by each of the traction surfaces 112 as each of the traction surfaces 112 repeatedly comes in contact with the terrain 120 as the track 100 is being driven (rotates), may be relatively more uniform across the area of each of the traction surfaces 112. In an aspect, and depending on the application of each particular track 100, each of the primary load distribution members 302 may reduce the magnitudes of peak pressures experienced by the traction surface(s) 112 corresponding to that primary load distribution member 302.

Reference is now made to FIG. 9. In some embodiments, each of the primary load distribution members 902 may be flexible between the first unloaded position 706*a*, a first partially loaded position 906 and a first loaded position 908. As shown in FIG. 9, the first partially loaded position 906 may be between the first unloaded position 706*a* and the first loaded position 908.

In the first partially loaded position 906, a traction surface 904 that is disposed under that primary load distribution member 902 when that traction surface 904 contacts the terrain 120 may have a concave third shape that is less concave than the concave first shape, when: a) the at least one of the wheels 104 applies a first downward wheel force, for example as illustrated by reference arrows 910 in FIG. 9, onto the wheel-facing side 108 of the carcass 912 over that primary load distribution member 902, and b) that traction surface 904 contacts a substantially planar portion 914 of the terrain 120.

In the first loaded position 908, that traction surface 904 may have a substantially planar shape, as shown in FIG. 9, when: a) the at least one of the wheels 104 applies a second downward wheel force, for example as illustrated by reference arrows 916 in FIG. 9, that is larger in magnitude than the first downward wheel force 910, for example as illustrated by reference arrow 118 in FIG. 1, onto the wheel-facing side 108 of the carcass 912 over that primary load distribution member 902, and b) that traction surface 904 contacts that portion 914 of the terrain 120.

In another aspect, each of the primary load distribution members 902 may be biased toward the first unloaded position 706*a* of that primary load distribution member 902.

Additional Example Embodiments of the Track

Reference is now made to FIG. 9. In some embodiments, the track 900 may comprise an endless elastomeric carcass 920 having a wheel-facing side 108 that is mountable onto the plurality of wheels 104, and a ground-facing side 110 opposite the wheel-facing side 108. The track may further comprise a plurality of elastomeric traction surfaces 904 positioned on the ground-facing side 110, each of the traction surfaces 904 having a first shape 904 when the wheel-facing side 108 of the carcass 920 is not mounted onto the plurality of wheels 104.

In a further aspect, the track 900 may also comprise a plurality of concave primary load distribution members 902 positioned transversely and distributed longitudinally in the carcass 920 so as to distribute when the track 900 is being driven at least parts of downward wheel forces 118 applied by at least one of the wheels 104 down onto the wheel-facing side 108 of the carcass 920 into the traction surfaces 904 via flexion of the primary load distribution members 902.

For clarity it should be noted that, in the embodiments described in the two following paragraphs, each of the primary load distribution members 902 may be concave when the wheel-facing side 108 of the carcass 920 is not mounted onto the plurality of wheels 104.

In a further aspect, in these embodiments, the first shape may be one of: substantially planar, and concave. For example, in the embodiment shown in FIG. 9, the each of the traction surfaces 904 has a shape that is substantially planar (that is, the first shape is a substantially planar shape), and each of the primary load distribution members 902 is concave.

In an aspect, such embodiments of the track 900 may provide a relatively more uniform pressure distribution in the traction surfaces in some applications of the track 900 and for some types of vehicles 102.

Carcass Having a Substantially Rectangular Cross Section

Reference is now made to FIGS. 2 to 5, and 7 to 11B. As shown, in various embodiments, the carcass 106 may have a substantially rectangular widthwise cross section 210, 716, 816, 920, 1010, 1120, 1122 that is positioned such that when the track 100, 800, 900, 1000, 1100*a*, 1100*b* is being driven and the vehicle 102 drives over substantially planar terrain 914, the substantially rectangular widthwise cross section 210, 716, 816, 920, 1010, 1120, 1122 of the carcass 106 is substantially parallel to that terrain 914. FIG. 9 shows a substantially rectangular widthwise cross section 920 of a carcass 106 being substantially parallel to substantially planar terrain 914.

In some cases, a carcass 106 that has a substantially rectangular widthwise cross section 210 may be said to be substantially flat.

Wheel-Contacting Surface

In a further aspect, the track 100, 900 may include a substantially planar wheel-contacting surface 206 positioned longitudinally on the wheel-facing side 108 of the carcass 106 such that at least one of the wheels 104 rolls on the wheel-contacting surface 206 when the track 100 is being driven.

In another aspect, the wheel-contacting surface 206 may be positioned on the wheel-facing side of the carcass 106 such that at least one of the wheels 104 may roll on the wheel-contacting surface 206 when the track 100 is being driven.

Depending on the particular vehicle(s) 102 for which a given embodiment of the track 100 may be designed, the wheel-contacting surface 206 may have at least one wheel-receiving portion 206*a,b* on which the at least one of the wheels 104 may roll when the track 100 is being driven.

Figure 2:
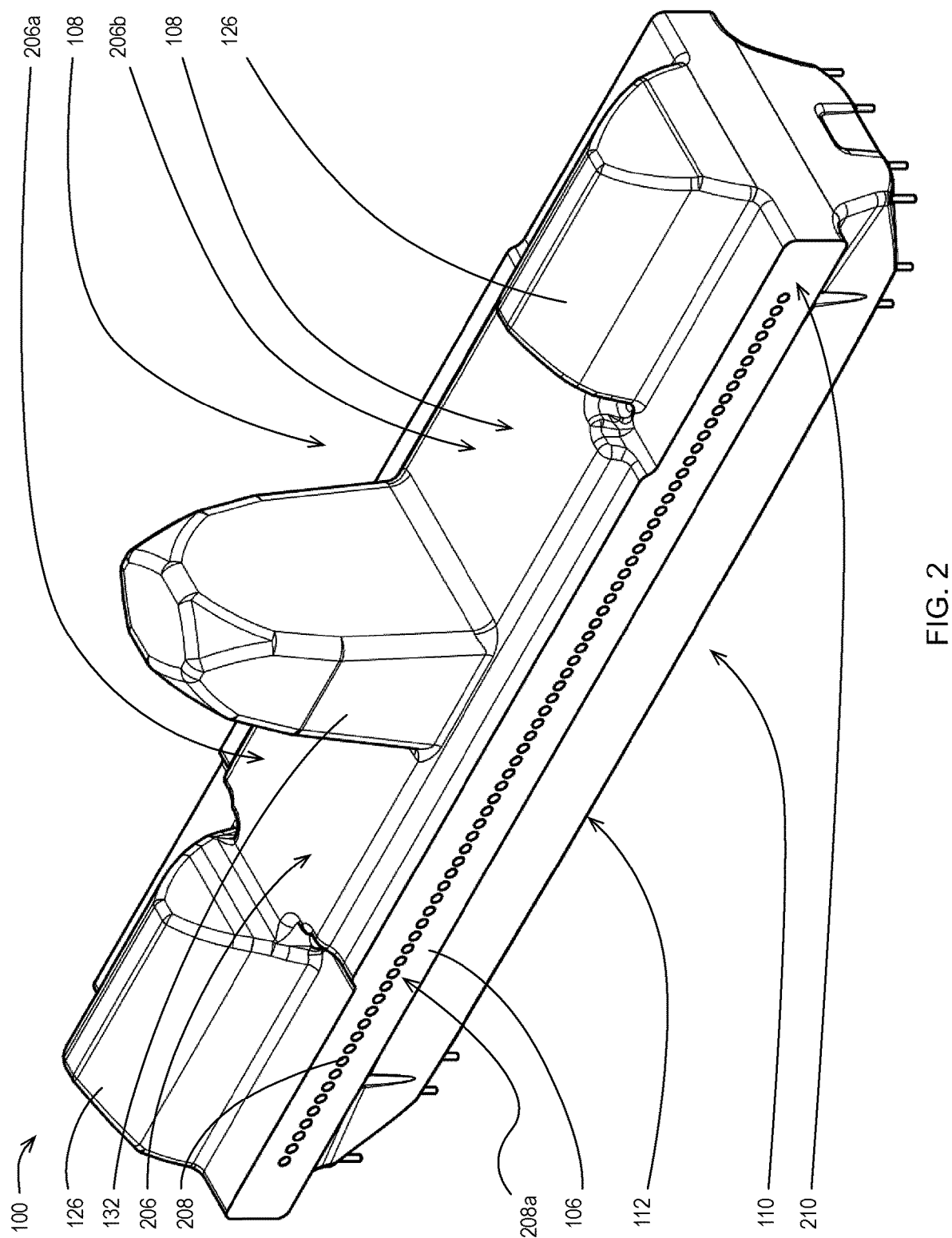
FIG. 2 is a first isometric view of a part of one of the tracks of FIG. 1, according to a first embodiment of that track.

For example, the embodiment of the track 100 shown in FIG. 2 has two wheel-receiving portions 206a,b: a first wheel-receiving portion 206a, and a second wheel-receiving portion 206b. Each of the first and second wheel-receiving portions 206a, 206b may be positioned such that a road wheel 130 of the wheels 104 rolls on that wheel-receiving portion 206a, 206b when the track 100 is driven.

Flat Carcass Function in Some Applications

In an aspect, a substantially flat carcass 106 may improve track stability and may reduce wear of the track 100 in at least some applications. In a further aspect, in in some embodiments and in some applications, a substantially flat carcass 106 may cooperate with the primary load distribution members 302 to improve track 100, 900 stability and to reduce wear of the track 100, 900.

In an aspect, track stability may include a measure of vibrations and widthwise alignment of the track 100, 900 relative to the wheels 104 onto which the track 100, 900 may be mounted.

Example Longitudinal Reinforcement Assembly Embodiments

Reference is now made to FIG. 2. In some embodiments, the track 100, 900 may include a longitudinal reinforcement assembly 208 disposed longitudinally in the carcass 106.

The longitudinal reinforcement assembly 208 may have a substantially planar widthwise cross section 208a when the wheel-facing side 108 of the carcass 106 is not mounted onto the plurality of wheels 104. In some embodiments, the track 100, 900 may include a longitudinal reinforcement assembly 208 that has a substantially planar widthwise cross section 208a when the track 100 is being driven.

In some embodiments, the track 100, 900 may further comprise: a) a longitudinal reinforcement assembly 208 that is disposed longitudinally in the carcass 106 the longitudinal reinforcement assembly 208 having a substantially planar widthwise cross section, for example as shown in FIG. 2, when the wheel-facing side 108 of the carcass 106 is not mounted onto the wheels 104; and b) a carcass 106 that has a substantially rectangular widthwise cross section, as shown for example in FIGS. 2 to 5 and 7 to 11B.

In an aspect, the longitudinal reinforcement assembly 208 may be positioned in the carcass 106 such that the substantially planar widthwise cross section of the longitudinal reinforcement assembly 208 is substantially parallel to the widthwise cross section of the carcass 106 when the wheel-facing side 108 of the carcass 106 is not mounted onto the wheels 104. In an aspect, the longitudinal reinforcement assembly 208 may be positioned in the carcass 106 such that the substantially planar widthwise cross section of the longitudinal reinforcement assembly 208 is substantially parallel to the widthwise cross section of the carcass 106 when track 100 is being driven.

Track Pitch

In an aspect, the track 100 may have a given track pitch 124, as illustrated by reference lines 124 in FIG. 1. The track pitch 124 may be, for example, a given distance between adjacent drive lugs 126 of the track 100. The longitudinal reinforcement assembly 208 may be selected to maintain the track pitch 124 within a desired range of track pitches when the track 100 is being driven. In an aspect, the desired range of track pitches may be selected to suit a particular type or type(s) of vehicle 102 for which the track 100 may be designed.

In an aspect, maintaining the track pitch 124 within the desired range of track pitches may maintain engagement between the drive lugs 126 of the track 100 and the drive wheel(s) 128 of the wheels 104 onto which the track 100 may be mounted when the track 100 is driven, in order to, for example, reduce or eliminate, depending on each particular embodiment of the track 100 and the driving conditions, tooth skipping between a drive sprocket 128 of the wheels 104 and the track 100.

Example Embodiments of Auxiliary Load Distribution Members

In some embodiments, track 100 may include a plurality of auxiliary load distribution members 304. In an aspect, each of the auxiliary load distribution members 304 may be positioned transversely and distributed longitudinally in the carcass 106 to cooperate with the primary load distribution members 302, 902 to distribute into the primary load distribution members 302, 902 at least parts of the downward wheel forces 118 via flexion of the auxiliary load distribution members 304.

In another aspect, each of the auxiliary load distribution members 304 may be positioned transversely and distributed longitudinally in the carcass 106 to cooperate with a corresponding primary load distribution member 302 of the plurality of primary load distribution members 302 to distribute into the corresponding primary load distribution member 302 at least parts of the downward wheel forces 118 that may be applied by the at least one of the wheels 104 onto the wheel-facing side 108 of the carcass 106 when the track 100, 900 is being driven.

A primary load distribution member 302 that is positioned such that it is under an auxiliary load distribution member 304 when it receives a downward wheel force, corresponds to that auxiliary load distribution member 304, and that auxiliary load distribution member 304 corresponds to that primary load distribution member 302.

Further, as shown in FIG. 3, in some embodiments of the track 100, each of the auxiliary load distribution members 304 may be positioned between one of the primary load distribution members 302 and the wheel-facing side 108 of the carcass 106. In another aspect, each of the auxiliary load distribution members 304 may be positioned to distribute at least parts of the downward wheel forces 118 into a corresponding one of the primary load distribution members 302 via flexion of that auxiliary load distribution member 304.

In yet another aspect, each of the auxiliary load distribution members 304 may have a second spring constant in flexion. An example of directions of flexion of a particular embodiment of an auxiliary load distribution member 304 is shown by reference arrows 806, 808, and 810 in FIG. 8. In a further aspect, FIG. 8 also shows examples of possible radii of flexion of that particular embodiment of the auxiliary load distribution member 304, shown with reference numerals 806a, 808a, and 810a.

In some embodiments, the second spring constant in flexion may be an overall effective spring constant of each of the auxiliary load distribution members 304. In other embodiments, the second spring constant in flexion may be a spring constant of a given part of each of the auxiliary load distribution members 304.

In an aspect, as shown in FIG. 9, the second spring constant of each of the auxiliary load distribution members 304 may be selected such that that auxiliary load distribution member 304 may be flexible between a second unloaded position 922a and a second loaded position 922b and biased toward the second unloaded position 922a.

In a further aspect, the second spring constant of each of the auxiliary load distribution members 304 may be selected such that that auxiliary load distribution member 304 may be in the second unloaded position 922a when no downward wheel force of the downward wheel forces 118 is applied to the wheel-facing side 108 of the carcass 106 over that auxiliary load distribution member 304, and in the second loaded position 922*b* when a second downward wheel force of the downward wheel forces 118 is applied to the wheel-facing side 108 of the carcass 106 over that auxiliary load distribution member 304.

In some embodiments, the second downward wheel force may be the first downward wheel force. In other embodiments, second downward wheel force may be different from the first downward wheel force.

In some embodiments, the auxiliary load distribution members 304 may be selected to cooperate with the primary load distribution members 302 such that when a given one of the primary load distribution members 302 is in the first unloaded position 706*a*, an auxiliary load distribution member 304 corresponding to that primary load distribution member 302 is in the second unloaded position 922*a*.

In further embodiments, the auxiliary load distribution members 304 may be selected to cooperate with the primary load distribution members 302 such that when a given one of the primary load distribution members 302 is in the first loaded position 706*b*, an auxiliary load distribution member 304 corresponding to that primary load distribution member 302 is in the second loaded position 922*b*.

In yet further embodiments, the auxiliary load distribution members 304 may be selected to cooperate with the primary load distribution members 302 such that when a given auxiliary load distribution member 304 is in the second loaded position 922*b*, a traction surface 112 corresponding to that auxiliary load distribution member 304 has a substantially planar shape when it contacts a substantially planar portion 914 of the terrain 120.

Additional Embodiments of the Track

Figure 11A:
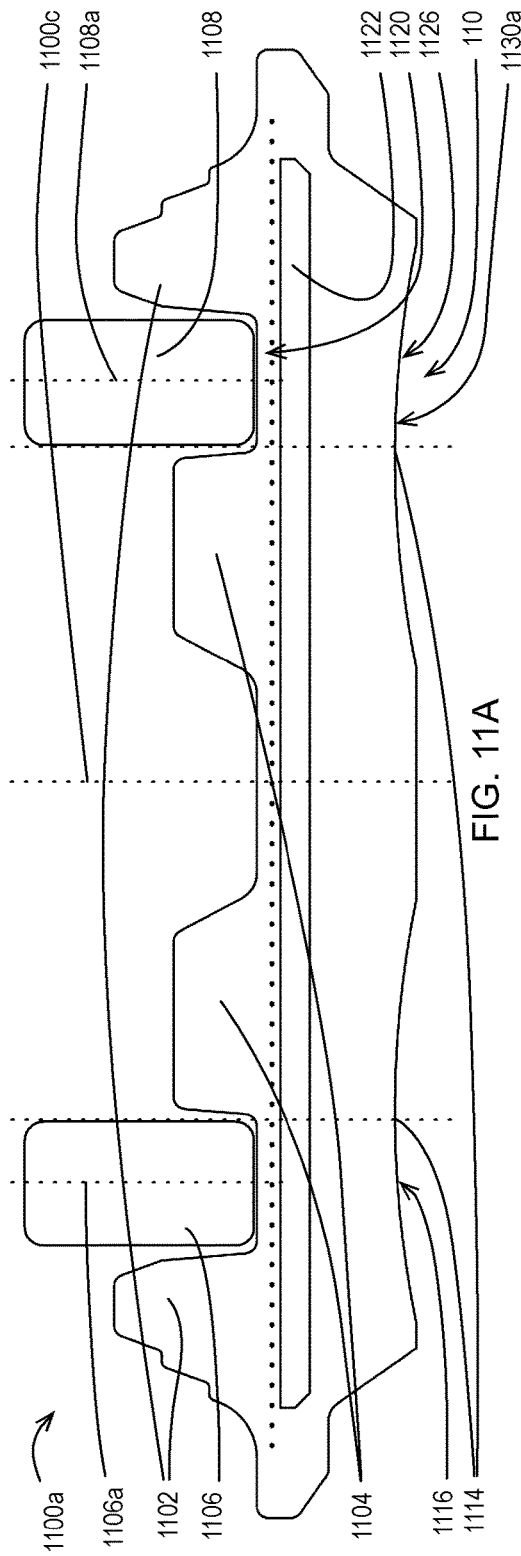
FIG. 11A is a front section view of one of the tracks of FIG. 1, according to a fifth embodiment of that track, taken along section lines A-A of FIG. 1.
Figure 11B:
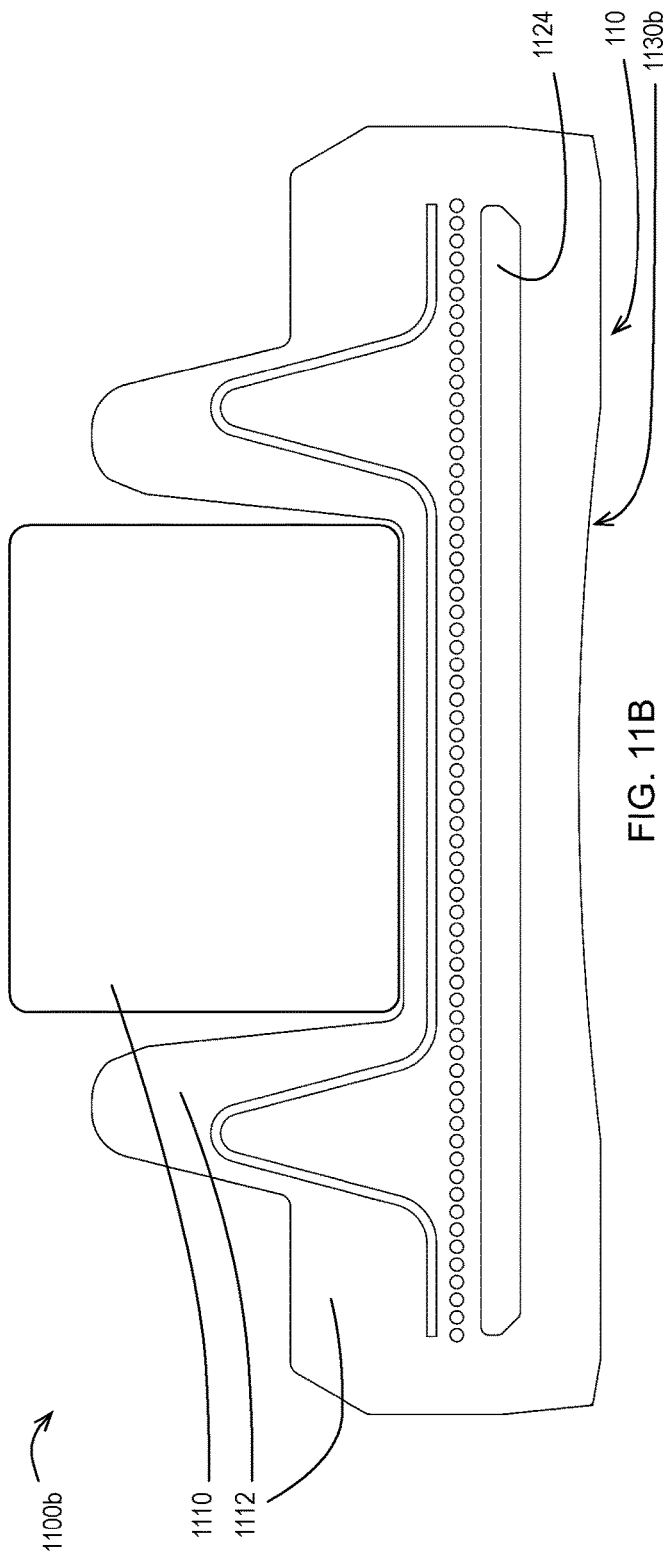
FIG. 11B is a front section view of one of the tracks of FIG. 1, according to a sixth embodiment of that track, taken along section lines A-A of FIG. 1.
Figure 12:
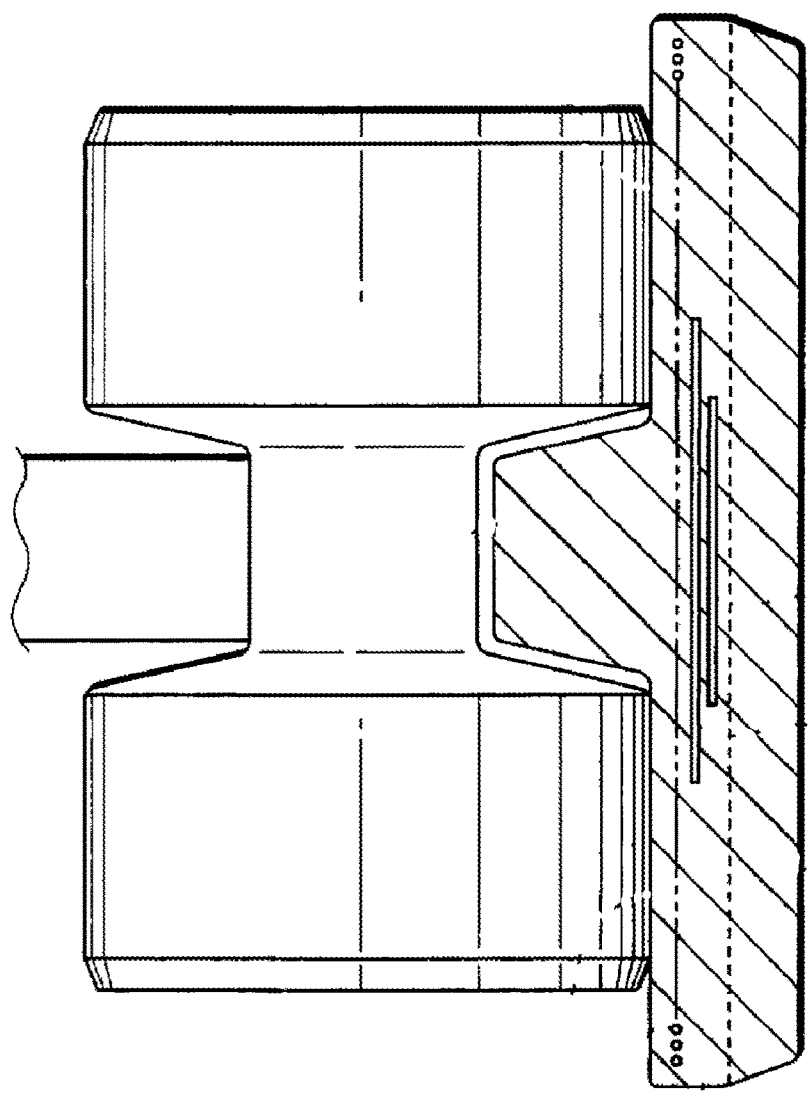
FIG. 12 is a front section view of a prior art track engaged by a wheel.

Reference is now made to FIGS. 10, 11A, and 11B, which show additional embodiments of the track 1000, 1100*a*, 1100*b*. As illustrated by these figures, the various embodiments of the track 100, 900, 1000, 1100*a*, 1100*b* may each be designed to be mounted onto a particular type, or types, of vehicle 102, having a particular type, or types, of wheels 104.

For example, in some embodiments of the track 1000, 1100*a*, the concave first shape of each of the traction surfaces 112, 1004, 1130*a*, 1130*b* may have a first concavity 1006, 1116 and a second concavity 1008, 1126 and each of the first and second concavities 1006, 1008, 1116, 1126 may be positioned on the ground-facing side 110 of the carcass 106 such that each of the first and second concavities 1006, 1008, 1116, 1126 is disposed widthwise under one of the wheels 104, 1106, 1108, 1110 of the vehicle 102 when the track 100 is being driven and when that traction surface 112, 1004, 1130*a*, 1130*b* contacts the terrain 120.

In another aspect, the various other features of the various embodiments of the track 100, such as the guide lugs 1102, the drive lugs 1104, may be adopted, as may be required to be usable with the particular type(s) of vehicle(s) 102 and particular type(s) of wheels 104 for which each of the various embodiments of the track 100 may be designed.

As an example, the example embodiment of the track 1100*a* shown in FIG. 11A may be designed to be implemented with vehicles 102 in which each of the road wheels 130 includes a first road wheel 1106 and a second road wheel 1108. In this example, the track 1100*a* includes guide lugs 1102, and drive lugs 1104.

As shown, each of the traction surfaces 1130*a* in this example includes two concavities 1116, 1126, and each of the two concavities 1116, 1126 is disposed widthwise under one of the first and second road wheels 1106, 1108. In this example, each of the two concavities 1116, 1126 has an apex 1114, and the apex 1114 of each of the two concavities 1116, 1126 is offset from widthwise from a widthwise center 1106*a*, 1108*a* of each of the first and second road wheels 1106, 1108 toward a widthwise center 1100*c* of the track 1100*a*.

For some particular arrangements of the wheels 104 for which a given embodiment of the track 100 may be designed, a widthwise offset of the concavity(ies) 702, 1116, 1126 of the traction surfaces 1116, as described above, may be implemented and a magnitude of the widthwise offset may be selected to reduce pressure variations that may be experienced by the traction surfaces 1116 when that embodiment of the track 100 is driven.

As another example, the example embodiment of the track 1100*b* shown in FIG. 11B may be designed to be implemented with vehicles 102 in which each of the road wheels 130 is a single road wheel 1110. In this example, the track 1100*a* includes guide lugs 1112, and drive lugs 1112, and each one of the guide lugs 1112 is one of the drive lugs 1112.

Examples of Auxiliary Member Geometry

In an aspect, a suitable geometry for each of the auxiliary load distribution members 304 may be selected depending on, for example, the particular vehicle(s) 102 for which a given embodiment of the track 100, 800 may be designed.

For example, as shown in the embodiment of FIG. 3, each of the auxiliary load distribution members 304 may have a concave portion 306. The concave portion 306 may have a first side portion 306*a* and a second side portion 306*b* joined at a top end 306*e* thereof to the first side portion 306*a*.

Each of the auxiliary load distribution members 304 may further include a first lateral portion 306*c* extending from the first side portion 306*a* and a second lateral portion 306*d* extending from the second side portion 306*b*. In some embodiments, and as shown in FIG. 3, at least part of the concave portion 306 may be positioned in a guide lug 204.

Where at least part of an auxiliary load distribution member 304 is positioned in a guide lug 204, that guide lug 204 corresponds to that auxiliary load distribution member 304, and that auxiliary load distribution member 304 corresponds to that guide lug 204.

In some embodiments, the first and second lateral portions 306*c,d* of each of the auxiliary load distribution members 304 may be positioned between the wheel-contacting surface 206 and the primary load distribution members 302.

In the embodiment of FIG. 3, the first lateral portion 306*c* of each of the auxiliary load distribution members 304 is positioned between the first wheel-receiving portion 206*a* and the primary load distribution members 302, and the second lateral portion 306*d* of each of the auxiliary load distribution members 304 is positioned between the second wheel-receiving portion 206*b* and the primary load distribution members 302.

Example Proportions of Primary Load Distribution Members

Further aspects of the track 100 are described below.

In some embodiments, each of the primary load distribution members 302 may have a primary load distribution member width 708, as shown by reference arrows 708 in FIG. 7. Likewise, the track 100 may have a track width 710, as shown by reference arrows 710 in FIG. 7.

In some embodiments, and depending on the particular vehicle 102 for which a given track 100 may be designed, the primary load distribution member width 708 of each of the primary load distribution members 302 may be in magnitude at least 50% of the magnitude of the track width

710. In further embodiments, the primary load distribution member width 708 may in magnitude be at least 80% of the magnitude of the track width 710. In yet further embodiments, the primary load distribution member width 708 may in magnitude be at least 90% of the magnitude of the track width 710.

The road wheels 130 of the wheels 104 may have a road wheel width 712, as shown by reference arrows 712 in FIG. 7. In some embodiments, the primary load distribution member width 708 of each of the primary load distribution members 302 may be selected to be, for example, in magnitude at least substantially equal to (i.e. or larger than), the road wheel width 712 of a given vehicle 102 for which a given embodiment of the track 100 may be designed. In other embodiments, the primary load distribution member width 708 of each of the primary load distribution members 302 may be selected to be, for example, in magnitude at least substantially equal to (i.e. or larger than), 50% of the road wheel width 712 of a given vehicle 102 for which a given embodiment of the track 100 may be designed.

Example Proportions of Auxiliary Load Distribution Members

In some embodiments, each of the auxiliary load distribution members 304 may have an auxiliary load distribution member width 918, as shown by reference arrows 918 in FIG. 9.

In some embodiments, and depending on the particular vehicle 102 for which a given track 100 may be designed, the auxiliary load distribution member width 918 of each of the auxiliary load distribution members 304 may be in magnitude at least 50% of the magnitude of the track width 710. In further embodiments, the auxiliary load distribution member width 918 may in magnitude be at least 80% of the magnitude of the track width 710. In yet further embodiments, the auxiliary load distribution member width 918 may in magnitude be at least 90% of the magnitude of the track width 710.

In some embodiments, the auxiliary load distribution member width 918 of each of the auxiliary load distribution members 302 may be selected to be, for example, in magnitude at least substantially equal to (i.e. or larger than), the road wheel width 712 of a given vehicle 102 for which a given embodiment of the track 100 having those auxiliary load distribution members 304 be designed. In some embodiments, the auxiliary load distribution member width 918 of each of the auxiliary load distribution members 302 may be selected to be, for example, in magnitude at least substantially equal to (i.e. or larger than), 50% of the road wheel width 712 of a given vehicle 102 for which a given embodiment of the track 100 having those auxiliary load distribution members 304 be designed.

Examples of Features of Concave Shapes

Figure 6:
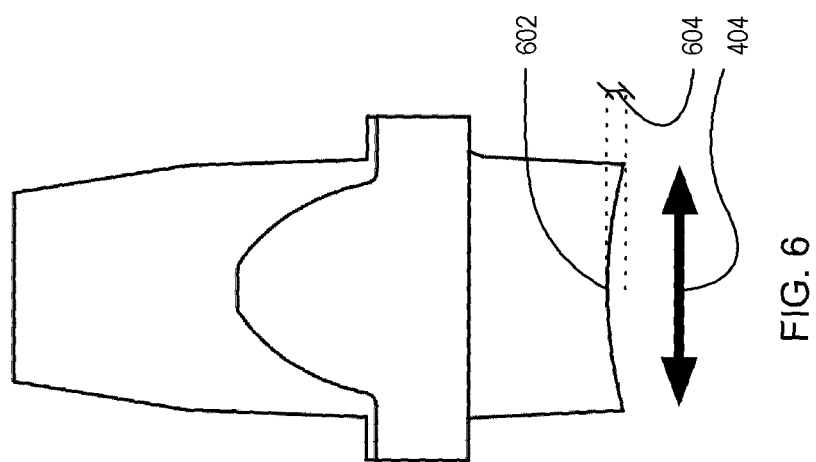
FIG. 6 is a side view of the part of that track of FIG. 2.

Reference is now made to FIGS. 4 and 6. In some embodiments, the concave first shape 112 of each of the traction surfaces 112 may have a widthwise concave portion 402, as shown by reference arrows 402. In some embodiments, the concave first shape of each of the traction surfaces 112 may have a lengthwise concave portion 404, as shown by reference arrows 404. In some embodiments, the concave first shape of each of the traction surfaces 112 may have both a widthwise concave portion 402, and a lengthwise concave portion 404, as shown by a combination of reference arrows 402 and 404 in FIGS. 4 and 6.

Reference is now also made to FIGS. 8 and 11. In a further aspect, the concave first shape 112 may have at least one of: a) a widthwise apex 1114 and a corresponding widthwise depth 812, and b) a lengthwise apex 602 and a corresponding lengthwise depth 604.

In yet a further aspect, and depending on the particular vehicle(s) 102 for which a given embodiment of the track 100 may be designed, the widthwise depth 812 may be selected to cooperate with the lengthwise depth 604 to reduce pressure variations that may be experienced by the traction surfaces 112 when that track 100 is driven.

In some embodiments of the track 100 in which each of the traction surfaces 112 has both a widthwise apex 1114 and a lengthwise apex 602, the widthwise depth 812 of the concave first shape 112 of each of the traction surfaces 112 may be equal in magnitude to the magnitude of the lengthwise depth 604 of that concave first shape 112. In other embodiments, the widthwise depth 812 of the concave first shape 112 of each of the traction surfaces 112 may be different in magnitude from the magnitude of the lengthwise depth 604 of that concave first shape 112.

Particular Examples of Concavity Depths

In an aspect, and depending on the particular vehicle(s) 102 for which the track 100 may be designed, the concave first shape 112 may be selected for the particular vehicle(s) 102 so as to provide for the functionality of the track 100, 800, as it is described in this document. In an aspect, the widthwise and lengthwise depths 812, 604 of the concave first shape 112, where that concave shape 112 has both of these depths 812, 604, may be selected to provide the functionality of the track 100, as the functionality is described in this document. In another aspect, the depth(s) 812, 604 may be selected based on the particular weight(s) and arrangement(s) of the wheels 104 of the vehicle(s) 102.

For example, in some embodiments, the concave first shape 112 of each of the traction surfaces 112 may have a widthwise depth 812 that is in a range of about 1 millimeter (mm) to about 8 mm. In a particular example where the track 100 may be designed for a vehicle 102 having a gross vehicle weight and an operating weight in a range of, for example, 40 to 45 metric tonnes, and having seven road wheels 130 per track 100, the concave first shape 112 of each of the traction surfaces 112 may have both a widthwise apex 1114 and a lengthwise apex 602, a widthwise depth 812 of about 1 mm to 4 mm, and a lengthwise depth 604 of about 1 mm and 4 mm.

In a more particular example, where the track 100 may be designed for a vehicle 102 having a gross vehicle weight and an operating weight in a range of, for example, 40 to 45 metric tonnes, and having seven road wheels 130 per track 100, the concave first shape 112 of each of the traction surfaces 112 may have both a widthwise apex 1114 and a lengthwise apex 602, a widthwise depth 812 of about 4 mm, and a lengthwise depth 604 of about 2 mm.

In some examples, and for example in embodiments of the track 100 that have a lengthwise depth 604 of 0 mm (i.e. embodiments in which the first concave shape 112 of each of the traction surfaces 112 lacks lengthwise concavity), the concave first shape 112 of each of the traction surfaces 112 may have a widthwise depth 812 that is in a range of about 0.25% to 4% of a width of the track 100.

Additional Reinforcement Elements

Reference is now made to FIG. 10. In a further aspect, as shown in FIG. 10, each particular track 100 may further comprise, depending on the particular application(s) and vehicle(s) 102 for which that particular track 100 may be designed, additional reinforcement elements 1002 known in the art to provide that particular track 100 with sufficient tensile strength to, for example, withstand the driving forces that that particular track 100 may receive from the wheels 104 of the vehicle(s) 102 when being driven.

In an aspect, the additional reinforcement elements 1002 may include additional longitudinal reinforcement elements 1002 positioned to increase the track's 100 effective tensile strength to preclude premature failure of the track 100 due to tensile forces that the track 100 may experience in the particular application(s) for which the track 100 may be designed.

For example, the additional reinforcement elements 1002 may include any suitable combination of longitudinal reinforcement fabric 1002 and/or steel 1002 positioned to provide each particular track 100 with sufficient effective tensile strength to preclude premature failure of that track 100 due to tensile forces that that track 100 may experience when being driven.

Each particular track 100 may also include any further additional suitable and known features that may be required for the particular application(s) and vehicle(s) 102 for which each particular track 100 may be designed.

Manufacturing and Materials Selection

In some embodiments, the carcass 106 of the track 100, 900, 1000, 1100a, 1100b may be made of a material that is different from the material(s) of the other features of that track 100 and the other features may be, for example, molded onto and into, as may be applicable for each of the other features, the carcass 106. In other embodiments, the carcass 106 may be made integral with at least one of the other features, such as guide lugs 132, drive lugs 126, and traction surfaces 112, of the track 100.

Aspects of Primary Member Selection

In another aspect, a desired first spring constant for each of the primary load distribution members 302 may be selected using known calculation and selection techniques, and may be obtained by, for example, selecting a suitable combination of material(s) and geometry for each of the primary load distribution members 302 to obtain the desired first spring constant for those the primary load distribution members 302.

To this end, each of the primary load distribution members 302 may be made from any suitable material(s), so long as the material(s) in combination with the geometry of each of the primary load distribution members 302 may provide for the functionality of the primary load distribution members 302, as the functionality is described in this document.

For example, in some embodiments each of the primary load distribution members 302 may be made from a suitable material, such as, for example, a combination of fiber and resin. In other embodiments, each of the primary load distribution members 302 may be made from a material that includes at least one of, for example: an aluminum alloy, a steel, a titanium alloy, and a carbon fiber.

Aspects of Auxiliary Member Selection

In another aspect, a desired second spring constant for each of the auxiliary load distribution members 304 may be selected using known calculation and selection techniques, and may be obtained by, for example, selecting a suitable combination of material(s) and geometry for each of the auxiliary load distribution members 304 to obtain the desired second spring constant for those the auxiliary load distribution members 304.

To this end, each of the auxiliary load distribution members 304 may be made from any suitable material(s), so long as the material(s) in combination with the geometry of each of the auxiliary load distribution members 304 may provide for the functionality of the auxiliary load distribution members 304, as the functionality is described in this document.

For example, in some embodiments each of the auxiliary load distribution members 304 may be made from a suitable material, such as, for example, a tempered spring steel. In other embodiments, each of the auxiliary load distribution members 304 may be made from a material that includes at least one of, for example: a steel, an aluminum alloy, a titanium alloy, a combination of fiber and resin, and a carbon fiber.

Materials and Manufacturing Generally

In a more general aspect, each of the features of the track 100 as the features were described in this document may be made from any suitable material(s), so long as the material(s) provide for the functionality of the track 100 as the functionality is described in this document.

In a further more general aspect, the various embodiments of the example tracks, and features of tracks, described in this document may be implemented using any suitable known materials, methods of selection of materials and geometries, methods of calculations, and methods of manufacture, so long as the functionality of the tracks, as it is described in this document, may be achieved. While particular embodiments, implementations, and applications are described in this document, it will be appreciated that other embodiments, implementations, and applications may be within the scope of the disclosure and claims included in this document.

The invention claimed is:

1. A track for a vehicle having a plurality of wheels for driving the track on a terrain, comprising:
    an endless elastomeric carcass having a wheel-facing side that is mountable onto the plurality of wheels, and a ground-facing side opposite the wheel-facing side;
    a plurality of elastomeric traction surfaces positioned on the ground-facing side, each of the traction surfaces having a concave first shape when the wheel-facing side of the carcass is not mounted onto the plurality of wheels; and
    a plurality of primary load distribution members positioned transversely and distributed longitudinally in the carcass so as to distribute, when the track is being driven, at least parts of downward wheel forces applied by at least one of the wheels down onto the wheel-facing side of the carcass into the traction surfaces via flexion of the primary load distribution members.

2. The track of claim 1, wherein each of the traction surfaces is positioned on the ground-facing side of the track such that each traction surface is disposed under at least one of the primary load distribution members when that traction surface contacts the terrain when the track is being driven to receive at least parts of the downward wheel forces received at that time by that primary load distribution member.

3. The track of claim 2, wherein each of the primary load distribution members is flexible between:
    a first partially loaded position in which a traction surface of the plurality of traction surfaces that is disposed under that primary load distribution member when that traction surface contacts the terrain has a concave third shape that is less concave than the first shape when:
        a) the at least one of the wheels applies a first downward wheel force onto the wheel-facing side of the carcass over that primary load distribution member, and
        b) that traction surface contacts a substantially planar portion of the terrain, and
    a first loaded position in which that traction surface has a substantially planar second shape when:

a) the at least one of the wheels applies a second downward wheel force that is larger in magnitude than the first downward wheel force onto the wheel-facing side of the carcass over that primary load distribution member, and b) that traction surface contacts that portion of the terrain.

4. The track of claim 3, wherein each of the primary load distribution members:

a) has a first unloaded position, the first partially loaded position being between the first unloaded position and the first loaded position, and b) is biased toward the first unloaded position.

5. The track of claim 1, wherein the carcass is substantially flat.

6. The track of claim 1, wherein the carcass has a substantially rectangular widthwise cross section.

7. The track of claim 1, further comprising a longitudinal reinforcement assembly disposed longitudinally in the carcass, the longitudinal reinforcement assembly having a substantially planar widthwise cross section when the wheel-facing side of the carcass is not mounted onto the plurality of wheels.

8. The track of claim 1, further comprising a plurality of auxiliary load distribution members, each of the auxiliary load distribution members being positioned transversely and distributed longitudinally in the carcass to cooperate with the primary load distribution members to distribute into the primary load distribution members at least parts of the downward wheel forces via flexion of the auxiliary load distribution members.

9. The track of claim 8, wherein each of the auxiliary load distribution members is positioned between one of the primary load distribution members and the wheel-facing side of the carcass.

10. The track of claim 9, wherein each of the auxiliary load distribution members has a second spring constant in flexion, the second spring constant being selected such that that auxiliary load distribution member is flexible between a second unloaded position and a second loaded position and biased toward the second unloaded position, and such that that auxiliary load distribution member is:

a) in the second unloaded position when no downward wheel force of the downward wheel forces is applied to the wheel-facing side of the carcass over that auxiliary load distribution member, and b) in the second loaded position when a second downward wheel force of the downward wheel forces is applied to the wheel-facing side of the carcass over that auxiliary load distribution member.

11. The track of claim 1, further comprising:

a) a plurality of guide lugs distributed longitudinally on the wheel-facing side of the carcass and positioned to engage with at least some of the wheels to maintain the track in widthwise alignment with the at least some of the wheels when the track is being driven; and b) a plurality of drive lugs distributed longitudinally on the wheel-facing side of the carcass and positioned to engage with at least one of the wheels to receive driving forces from the at least one of the wheels for driving the track.

12. The track of claim 11, wherein each one of the drive lugs is one of the guide lugs.

13. A track for a vehicle having a plurality of wheels for driving the track on a terrain, comprising:

an endless elastomeric carcass having a wheel-facing side that is mountable onto the plurality of wheels, and a ground-facing side opposite the wheel-facing side;

a plurality of elastomeric traction surfaces positioned on the ground-facing side, each of the traction surfaces having a first shape when the wheel-facing side of the carcass is not mounted onto the plurality of wheels; and a plurality of concave primary load distribution members positioned transversely and distributed longitudinally in the carcass so as to distribute when the track is being driven at least parts of downward wheel forces applied by at least one of the wheels down onto the wheel-facing side of the carcass into the traction surfaces via flexion of the primary load distribution members.

14. The track of claim 13, wherein the first shape is one of: substantially planar, and concave.

15. The track of claim 13, wherein each of the primary load distribution members has a first spring constant in flexion, the first spring constant being selected such that that primary load distribution member is flexible between a first loaded position and a first unloaded position and biased toward the first unloaded position, and such that that primary load distribution member is:

a) in the first unloaded position when no wheel force of the downward wheel forces is applied to the wheel-facing side of the carcass over that primary load distribution member, and b) in the first loaded position when a first downward wheel force of the downward wheel forces is applied to the wheel-facing side of the carcass over that primary load distribution member.

16. The track of claim 15, wherein each of the traction surfaces is positioned such that at least one of the primary load distribution members is disposed between that traction surface and the wheel-facing side of the carcass, and the first shape of that traction surface is selected to cooperate with that primary load distribution member such that that traction surface has a substantially planar second shape when:

a) a first downward wheel force of the downward wheel forces is applied down onto the wheel-facing side of the carcass over that primary load distribution member, and b) that traction surface contacts a substantially planar portion of the terrain.

17. The track of claim 13, wherein:

a) the track further comprises a longitudinal reinforcement assembly disposed longitudinally in the carcass, the longitudinal reinforcement assembly having a substantially planar widthwise cross section when the wheel-facing side of the carcass is not mounted onto the wheels;

b) the carcass has a substantially rectangular widthwise cross section; and c) the widthwise cross section of the longitudinal reinforcement assembly is substantially parallel to the widthwise cross section of the carcass when the wheel-facing side of the carcass is not mounted onto the wheels.

18. The track of claim 13, wherein the track includes a substantially planar wheel-contacting surface positioned longitudinally on the wheel-facing side of the carcass such that at least one of the wheels rolls on the wheel-contacting surface when the track is being driven.

19. The track of claim 13, further comprising a plurality of auxiliary load distribution members, each of the auxiliary load distribution members being positioned transversely and distributed longitudinally in the carcass to cooperate with the primary load distribution members to distribute into the primary load distribution members at least parts of the downward wheel forces via flexion of the auxiliary load distribution members.

20. The track of claim 19, wherein each of the auxiliary load distribution members is positioned between one of the primary load distribution members and the wheel-facing side of the carcass.

21. The track of claim 20, wherein each of the auxiliary load distribution members has a second spring constant in flexion, the second spring constant being selected such that that auxiliary load distribution member is flexible between a second unloaded position and a second loaded position and biased toward the second unloaded position, and such that that auxiliary load distribution member is:
   a) in the second unloaded position when no downward wheel force of the downward wheel forces is applied to the wheel-facing side of the carcass over that auxiliary load distribution member, and
   b) in the second loaded position when a second downward wheel force of the downward wheel forces is applied to the wheel-facing side of the carcass over that auxiliary load distribution member.

22. The track of claim 13, further comprising a longitudinal reinforcement assembly disposed longitudinally in the carcass, the longitudinal reinforcement assembly having a substantially planar widthwise cross section when the wheel-facing side of the carcass is not mounted onto the plurality of wheels.

23. The track of claim 13, further comprising:
   a) a plurality of guide lugs distributed longitudinally on the wheel-facing side of the carcass and positioned to engage with at least some of the wheels to maintain the track in widthwise alignment with the at least some of the wheels when the track is being driven; and
   b) a plurality of drive lugs distributed longitudinally on the wheel-facing side of the carcass and positioned to engage with at least one of the wheels to receive driving forces from the at least one of the wheels for driving the track.

* * * * *